United States Patent
Gieras et al.

(10) Patent No.: US 8,390,164 B1
(45) Date of Patent: Mar. 5, 2013

(54) METHOD OF FABRICATION OF PERMANENT MAGNET MACHINES WITH MAGNETIC FLUX REGULATION

(75) Inventors: Jacek F. Gieras, Glastonbury, CT (US); Gregory I. Rozman, Rockford, IL (US); Shin Katsumata, Rockford, IL (US)

(73) Assignee: Hamilton Sundstrand Corporation, Windsor Locks, CT (US)

(*) Notice: Subject to any disclaimer, the term of this patent is extended or adjusted under 35 U.S.C. 154(b) by 14 days.

(21) Appl. No.: 13/236,778

(22) Filed: Sep. 20, 2011

(51) Int. Cl.
    *H02K 1/00* (2006.01)
(52) U.S. Cl. .......................... 310/180; 29/596
(58) Field of Classification Search ........... 310/216.076, 310/216.101, 180, 190; 29/596
    See application file for complete search history.

(56) References Cited

U.S. PATENT DOCUMENTS

| | | | |
|---|---|---|---|
| 4,942,493 A | 7/1990 | Rozman | |
| 5,055,764 A | 10/1991 | Rozman | |
| 6,208,110 B1 | 3/2001 | O'Meara et al. | |
| 6,515,396 B1* | 2/2003 | Fritzsche | 310/216.076 |
| 6,661,150 B2 | 12/2003 | Utsumi | |
| 6,734,666 B2 | 5/2004 | Voillat | |
| 6,800,977 B1 | 10/2004 | Ostovic | |
| 6,806,615 B2* | 10/2004 | Enomoto et al. | 310/216.096 |
| 7,215,059 B1 | 5/2007 | Bitsche | |
| 7,579,812 B2* | 8/2009 | Dooley | 322/46 |
| 7,777,384 B2 | 8/2010 | Gieras et al. | |
| 7,843,155 B2 | 11/2010 | Rozman et al. | |
| 7,859,231 B2 | 12/2010 | Gieras et al. | |

* cited by examiner

*Primary Examiner* — Nguyen N Hanh
(74) *Attorney, Agent, or Firm* — Carlson, Gaskey & Olds, PC

(57) ABSTRACT

A method of forming a flux regulated machine includes winding stator windings into slots in an outer core. The outer core is formed to have a plurality of radially inwardly extending tooth pieces that are circumferentially spaced, and which define the slots. Further, control coils are wound around an inner core. Then, the inner core is inserted within the outer core such that the tooth pieces contact the inner core, and such that the control coils close off the slots at a radially innermost position. A flux regulated permanent magnet machine generally made according to this method is also disclosed.

11 Claims, 3 Drawing Sheets

METHOD OF FABRICATION OF PERMANENT MAGNET MACHINES WITH MAGNETIC FLUX REGULATION

BACKGROUND

This application relates to a method and apparatus for providing a flux regulated permanent magnet machine, wherein the stator is constructed of two separate cores.

Recently, flux regulated permanent magnet machines have been proposed. In general, these machines have outer slots formed between tooth pieces. Main stator windings are received in the slots. An inner flux diverter closes off the slots, and receives a control coil.

As shown in FIG. 1, a known permanent magnet machine 10 is provided with flux regulation and includes tooth pieces 12 defining intermediate slots or spaces 14, which receive main stator windings 16. Flux diverters 18 close off the spaces 14, and receive control coils 19. The control coils 19 control the flux at the main stator windings 16. Generally, if no control current is supplied to the control coils 19, a reluctance of the magnetic shunt provided by the flux diverters 18 is low because its magnetic permeability is high. Almost the total air gap magnetic flux produced by permanent magnets in an associated rotor 11 goes through the flux diverters 18. EMF induced in the main stator windings 16 is almost zero because the magnetic flux linked with the main stator windings 16 is very small.

If the control current is increased above zero, then the magnetic flux diverters 18 partially saturate, and their magnetic permeability decreases. Reluctance increases, and only a portion of the magnetic flux is shunted by the flux diverter 18. The magnetic flux linked with the main stator winding 16 increases, as does the EMF induced in the main stator windings 16.

A further increase in the control current further reduces the flux diverter reluctance, and its relative permeability becomes close to unity. A fully saturated flux diverter behaves as a free space, and almost the whole air gap magnetic flux excited by the rotor permanent magnets penetrates through the stator teeth 12 and excites a maximum EMF in the main stator windings 16. The benefits of such a system are known, as are the techniques for providing such control. Generally, the current in the control coils 19 is controlled to control the EMF and magnetic flux transmitted to the main stator windings 16 by the permanent magnets in the rotor 11.

However, challenges are raised to provide the stator, particularly in production quantities, given the location of the flux diverter 18 closing off the slot 14.

SUMMARY

A method of forming a flux regulated machine includes winding stator windings into slots in an outer core. The outer core is formed to have a plurality of radially inwardly extending tooth pieces that are circumferentially spaced, and which define the slots. Further, control coils are wound around an inner core. Then, the inner core is inserted within the outer core such that the tooth pieces contact the inner core, and such that the control coils close off the slots at a radially innermost position. A flux regulated permanent magnet machine generally made according to this method is also disclosed.

These and other features of the present invention can be best understood from the following specification and drawings, of which the following is a brief description.

DETAILED DESCRIPTION

A flux regulated machine as described above with regard to FIG. 1 is constructed in embodiments by utilizing an outer core and an inner core.

Figure 2A:
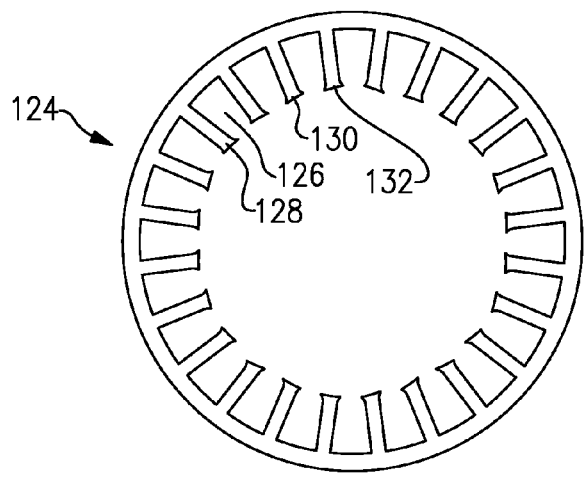
FIG. 2A shows a first component for making an embodiment of this invention.

As shown in FIG. 2A the outer core 124 has a plurality of slots 126 formed by teeth or tooth pieces 128. As shown at 130 and 132, the radially innermost edges or surfaces of the tooth pieces 128 may be angled. By "angled," this application means that the surfaces are not perpendicular or tangent to a radius extending through the tooth piece. Further, one can see that between the edges 130 and 132, the angles are in generally opposed directions.

Figure 2B:
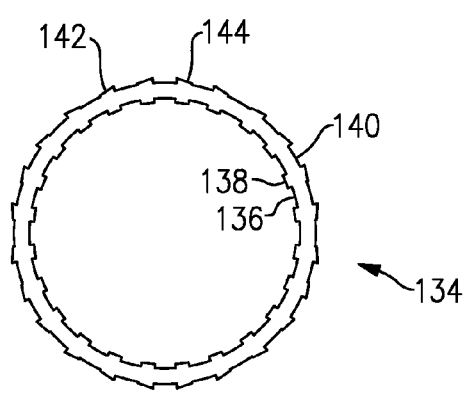
FIG. 2B shows a second component.

FIG. 2B shows an inner core 134. Inner core 134 has radially inner teeth 138 and intermediate slots 136. Slots 136 are at the same location as outer slots 140. As shown at 142 and 144, outer teeth on the radially outer side are formed at an angle which will generally correspond to the diverse angles of edges 130 and 132 of FIG. 2A.

Figure 3A:
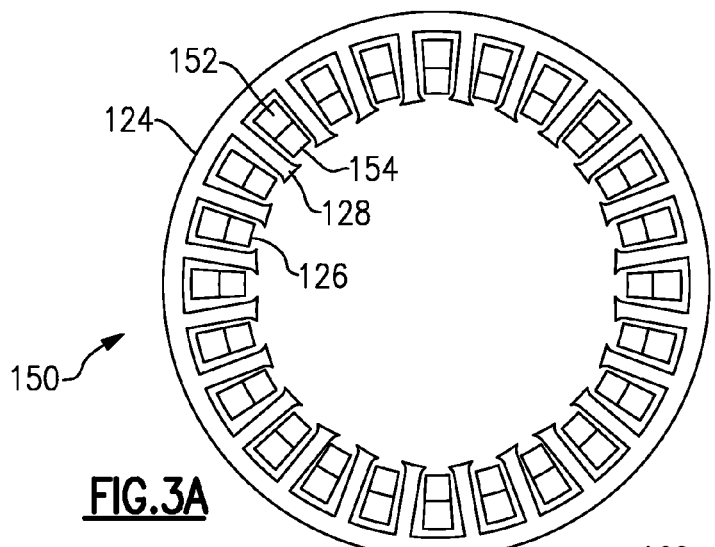
FIG. 3A shows a step in creating the first embodiment invention.

As shown in FIG. 3A, a stator outer core subassembly 150 utilizes the outer core 124, and provides main stator windings 152 and 154 within the slots 126. The outer core 124 can be formed of laminations, stamped or laser cut, and stacked. That is, generally, the outer core 124 and inner core 134 are formed by thin metal elements, that are stacked together to form an elongate stator core component.

By utilizing the open slots 126, the windings 152 and 154 can be easily deposited within the slots 126.

The outer core 124 is furnished with a typical three-phase winding distributed into the slots 126 in one or two layers. Two layers are shown. Other core winding arrangements can be utilized.

Similarly, the control coils 162 can be wound within the slots 136 and 140 on the inner core 134 to form a stator inner core subassembly 160. The slots 136/140 form the flux diverters. This is shown in FIG. 3B.

Figure 3B:
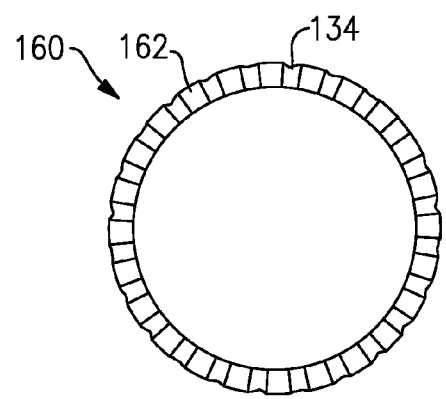
FIG. 3B shows another step.
Figure 3C:
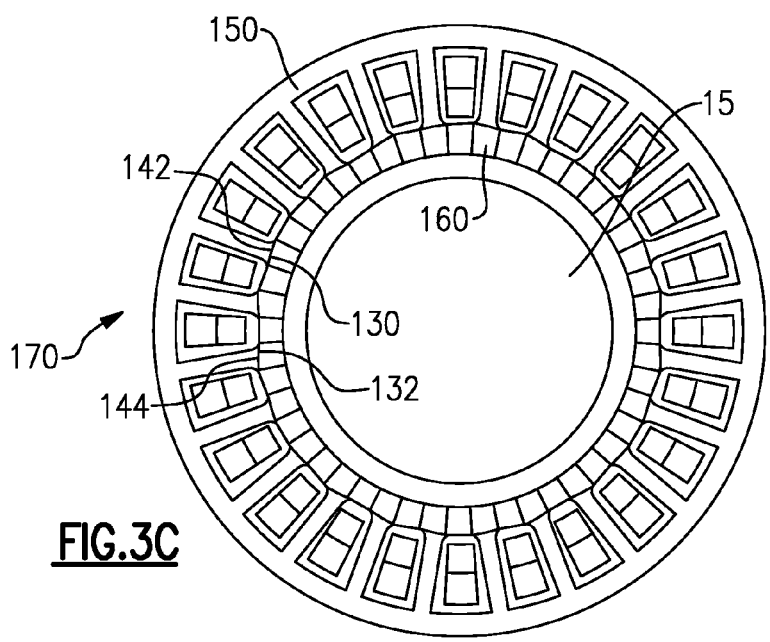
FIG. 3C shows a subsequent step.

After the steps of FIGS. 3A and 3B, the inner core 134 is inserted within the outer core 124 to form the stator 170 as shown in FIG. 3C. The inner core 134 may be force-fit within the outer core 124 to hold the two. As can be appreciated, the inner core 134 is positioned such that the control coils 162 extend across and close off the open slots 126.

The mating faces 130/142 and 144/132 provide anti-rotation mating surfaces forming an anti-rotation structure.

A stator 170 is provided that includes the complex winding arrangement with both the main stator windings and control coils, along with the flux diverters. However, the assembly is relatively simple, and does not require winding around the complex surface of the final product.

As show in FIG. 3C, a standard permanent magnet rotor 15 may be inserted into the stator 170 after assembly to form a flux regulated machine.

Figure 4:
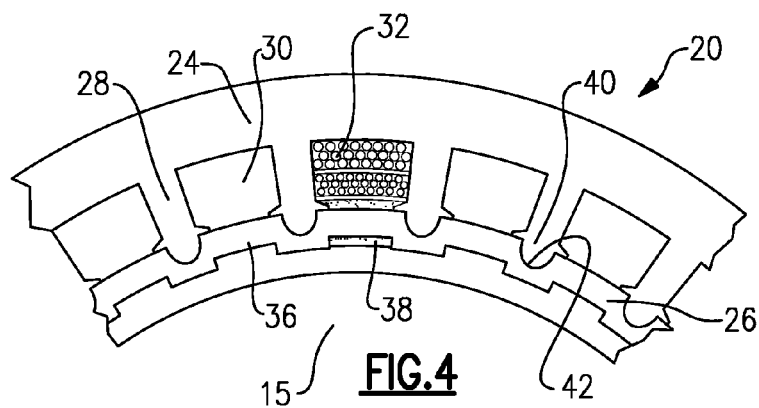
FIG. 4 shows an alternative embodiment.

FIG. 4 shows an alternative embodiment 20, wherein main stator windings 32 are provided in slots 30 on an outer core 24, and control coils 38 are provided on an inner core 36. Flux diverters 26 are provided as in the prior embodiment. In this embodiment, notches 42 are provided in the inner core 36 and pins 40 extend from the tooth piece 28 to provide the anti-rotation structure. As will be appreciated, the pins 40 and notches 42 can be located at alternate positions, such as providing pins 40 on inner core 36 and notches 42 on tooth pieces 28.

Figure 1:
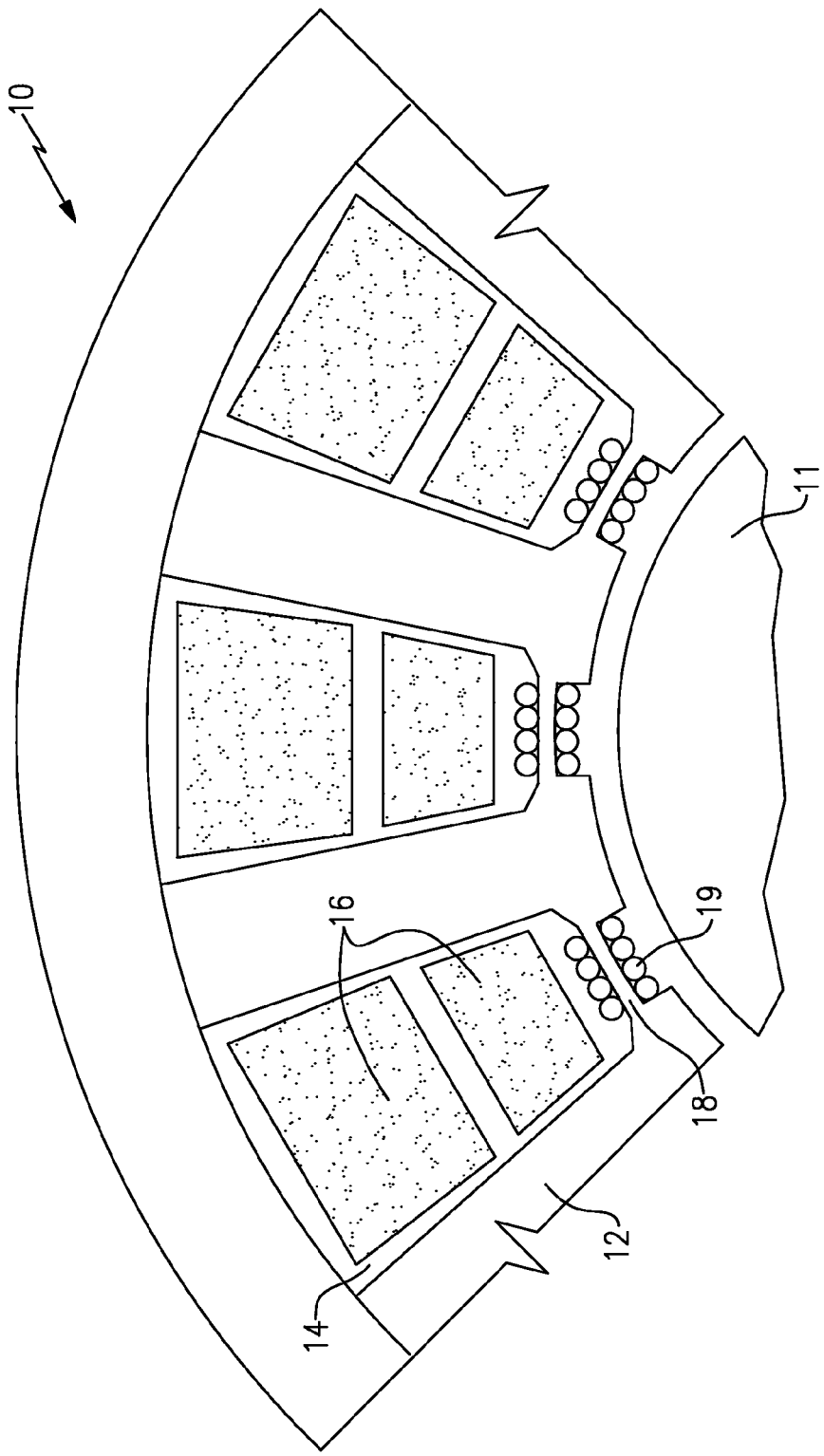
FIG. 1 shows a prior art construction.

The function of the control coil to control the main stator windings as set forth above with regard to FIG. 1, would also be true of the machines as shown in FIGS. 3C and 4.

The use of the disclosed two-part assembly actually allows standard stators for non-flux regulated machines to be utilized for the outer cores. Pole pieces are provided in prior art stators, and the use of the outer cores with inner cores will allow the use of those existing products.

In addition, the use of the inner core and outer core allows the selection of different magnetic materials. That is, since the two cores are associated with distinct magnetic functions, there may be benefits in selecting distinct materials for the two cores having different saturation flux densities to obtain faster saturation effects at a lower control current. As one example, the outer core may be fabricated using Hiperco-50 laminations, while the inner core could be fabricated using M-19 laminations. Of course, other materials may also be considered and used.

Standard stator liners can be used to insulate the stator slots. The inner core may be insulted using powder coating techniques. As an example, the part may be immersed into a fluidized bed of coating powder where plastic powder is melted onto the inner core. The control coils may then be wound.

Although embodiments of this invention have been disclosed, a worker of ordinary skill in the art would recognize that certain modifications would come within the scope of this invention. For that reason, the following claims should be studied to determine the true scope and content of this invention.

What is claimed is:

1. A method of forming a flux regulated machine comprising the steps of:
   winding stator windings into slots in an outer core having a plurality of radially inwardly extending tooth pieces that are circumferentially spaced, and which define the slots;
   winding control coils around an inner core; and
   inserting said inner core within said outer core such that said tooth pieces contact said inner core, and such that said control coils extend circumferentially across said slots to close the slots.

2. The method of as set forth in claim 1, including the step of preventing rotation between said inner core and said outer core.

3. The method as set forth in claim 1, wherein said inner core and said outer core are formed of distinct magnetic materials.

4. A flux regulated permanent magnet machine comprising:
   an outer core having a plurality of radially inwardly extending tooth pieces defining slots between adjacent tooth pieces;
   three-phase main stator windings received within said slots;
   a separate inner core positioned radially within said outer core, and said tooth pieces contacting said inner core, said inner core having portions extending circumferentially across radially inner extents of said slots and control coils formed on said inner core at the portions; and
   an anti-rotation structure formed between said outer core and said inner core.

5. The machine as set forth in claim 4, wherein said anti-rotation structure is found on each of said tooth pieces and corresponding locations on said inner core.

6. The machine as set forth in claim 4, wherein said tooth pieces have radially innermost surfaces which are at an angle that is non-perpendicular to a radial direction through the tooth piece, said inner core having mating surfaces.

7. The machine as set forth in claim 6, wherein there are distinct angles across the plurality of tooth pieces and the inner core.

8. The machine as set forth in claim 7, wherein there are opposed angles on said tooth pieces and said inner core.

9. The machine as set forth in claim 4, wherein one of said tooth pieces and said inner core have pins extending into notches in the other of said tooth pieces and said inner core.

10. The machine as set forth in claim 9, wherein said tooth pieces have said pins extending into notches in the inner core.

11. The machine as set forth in claim 4, wherein said inner core and said outer core are formed of distinct magnetic materials.

* * * * *